INVENTOR.
EARL I. ANDERSON
BY
Samuel B. Smith
ATTORNEY

Patented Aug. 14, 1951

2,564,554

UNITED STATES PATENT OFFICE 2,564,554

BACKGROUND CONTROL AND SYNCHRONIZING SIGNAL SEPARATING CIRCUIT

Earl I. Anderson, Manhasset, N. Y., assignor to Radio Corporation of America, a corporation of Delaware Application October 9, 1947, Serial No. 778,902

7 Claims. (Cl. 178—7.5)

My invention relates in general to television apparatus and more particularly to apparatus for restoring the direct current component to a signal from which it has either been lost or is misrepresented therein and also to circuits for separating the synchronizing signals from the video signals.

In apparatus of the prior art to which this invention belongs, the synchronizing signal has been separated from the video signal by using a so-called "clipper" circuit responsive to a range of voltage values within the range occupied by the synchronizing signals and without the range occupied by the video signals. The missing or misrepresented direct current component of the video signal has been restored in various well-known manners such, for instance, as shown in U. S. Patents Nos. 2,251,677 to Holmes and 2,289,914 to Kell.

The direct current reinsertion circuits have, in general, been independent of the apparatus used for removing the synchronizing signals from the composite video and synchronizing signal. It is an object of the present invention to provide an apparatus in which a single tube is used with associated circuits to remove the synchronizing signal from the composite video and synchronizing signal combination and also to effectively restore the misrepresented direct current component to the video signal.

It has been common practice in the art to which this invention pertains to separate the synchronizing signal from the composite video and synchronizing signal by clipping the composite at a particular signal amplitude or, in other words, using a limiting arrangement which allowed signals in a range beyond a definite amplitude to be transmitted and in which there are suppressed signals which are below this particular selected amplitude. Following this step the synchronizing signals have been clipped on the other side to provide a set of signals of constant amplitude and to reduce effects of interference. In contradistinction to this practice, the present invention accomplishes both clipping operations within the same tube with its associated circuits and additionally develops a signal to effectively restore the missing or misrepresented D. C. component to the video signal. It is therefore a further object of the invention to provide apparatus in which this is accomplished.

It is a further object of the invention to provide an arrangement of the general nature referred to hereinbefore in which the synchronizing signal may be impressed onto the last video amplifying stage with its polarity negative at the input of this stage with the result that noise and other spurious signals which exceed the signal in amplitude are clipped and removed in the video amplifier per se.

Other objects will be apparent from a reading of the hereinafter appended specification and claims.

My invention, in general, provides a pentode type of tube which may have an unbypassed resistor connected in the cathode-ground circuit thereof and also a bypassed cathode resistor connected in the cathode-ground circuit, the resistors being connected serially with each other. Connected in the output circuit of the tube is a load resistor having a high value and which has the effect of limiting the maximum plate current output in a fashion such that plate current saturation occurs with an input signal voltage in the range of the synchronizing signal voltage. The cathode bias is of the proper magnitude to place all of the video information in the signal which is impressed onto the tube beyond the cut-off point of the tube and only the synchronizing pulses appear in the plate current. The synchronizing pulses have sufficient peak amplitude to extend beyond the knee of the characteristic curve of the tube with its load resistor.

In this embodiment, signals from the last video amplifying stage are impressed onto the cathode of the reproducing kinescope in view of their polarity since, as has been indicated hereinbefore, the signals have been impressed onto the input of this amplifying stage with the synchronizing signals of a negative polarity. It will be appreciated that this invention is not limited to this particular embodiment.

The bypassed cathode resistor will have a D. C. voltage developed across it which is a function of the average value of the signal and hence may be used to effectively reinsert the D. C. component into the video signal, and this voltage is applied directly to the grid of the kinescope for this purpose.

My invention will best be understood by reference to the drawings in which.

Figures 1, 2:
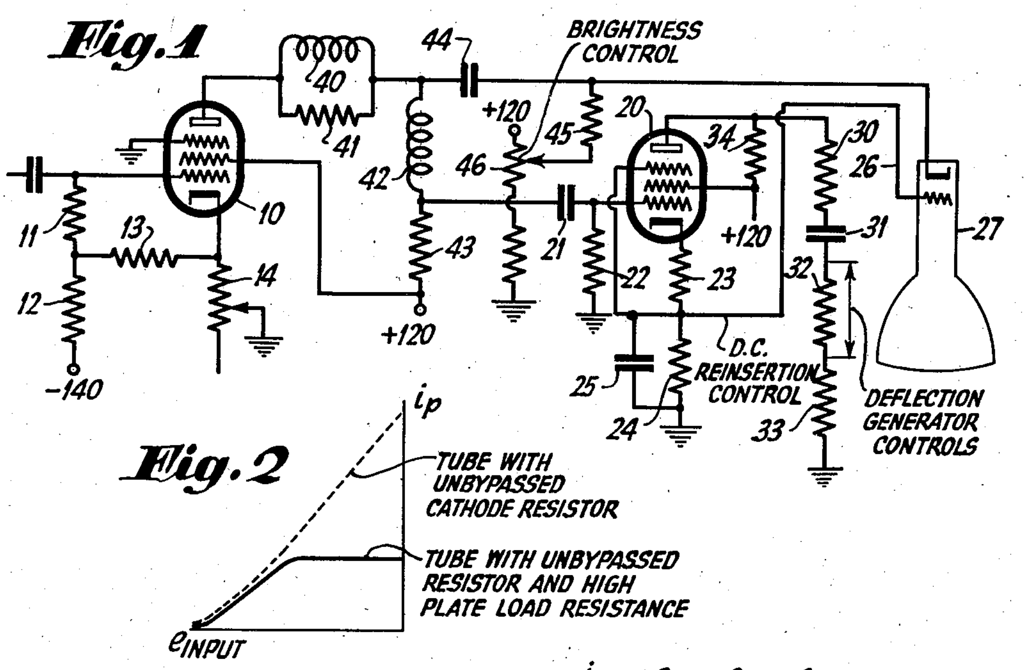
Figure 1 is a schematic circuit diagram of an embodiment of my invention.
Figures 2 through 4 are explanatory curves.

Referring to Figure 1, there is shown a schematic circuit diagram of an embodiment of the invention. The video amplifying stage comprises a pentode tube 10 onto the input circuit of which there is impressed the composite video and synchronizing signal in such a fashion that the synchronizing signal has a negative polarity. The control grid of the tube, which in actual practice has been a 6AU6 type of tube, has serially connected resistors 11 and 12 connected in the control grid-cathode circuit and there is provided a further resistor 13 between the common terminal of resistors 11 and 12 and the cathode of the tube.

Connected in the cathode-ground circuit of the tube is a potentiometer having resistor 14 and the position of the slide arm of the potentiometer determines the contrast of the reproduced image on the kinescope. This method of contrast control has the advantage that the impedance of that circuit is very low and any reasonable amount of capacitance across the control will not affect its performance. As the gain is reduced, the input capacitance decreases and the output characteristic of the amplifier becomes more linear.

The negative bias for the video amplifier is obtained from the —140 volt power supply through the divider including resistor 12 and the connection through the resistor 13 to the cathode of the tube. Since the voltage across the contrast control per se is small compared with the 140 volts, the bias applied to the video stage remains constant and is independent of the setting of the control. It will be appreciated that the illustration of the 140 volt bias value is purely illustrative and that suitable bias would be selected in accordance with the type of tube used and the parameters of the circuit elements used in conjunction therewith.

Because of the positive polarity of the output signal from this amplifier caused by the input thereto having been applied as a negative signal, it is necessary that the output of the video stage be applied to the cathode of the kinescope rather than the grid. Because the average cathode current of the kinescope is only a relatively few microamperes for a bright picture, capacitance coupling into the cathode may be accomplished by using a relatively small condenser and a large resistor. In actual practice, the condenser has had a value of .25 microfarad and the resistor has been 150,000 ohms. This circuit including resistor 45 is used to control the brightness of the reproduced picture.

The output of tube 10 is impressed onto a control grid circuit of the tube 20 which is used to develop the signal utilized for direct current reinsertion purposes and which also is utilized to separate the synchronizing signals from the composite video and synchronizing signals by double clipping the synchronizing signals and passing them to utilizing circuits which, in actual practice, will be the horizontal and vertical deflection generators used with the kinescope. For purposes of simplicity, these generators, per se, have not been shown. The composite signal is impressed onto the control grid through coupling condenser 21 and grid resistor 22.

The cathode of tube 20 is grounded through an unbypassed resistor 23 and a second resistor 24 connected serially with resistor 23. The resistor 24 is shunted by by-pass condenser 25. The common terminal of resistors 23 and 24 is connected through appropriate conducting means 26 to the grid of kinescope 27.

The anode of tube 20 is connected through a series voltage divider circuit consisting of resistor 30, blocking condenser 31, and resistors 32 and 33 to ground. Plate potential for tube 20 is applied through resistor 34.

In actual practice, the tube 20 has been a 6AU6 type of pentode. The resistor 23 has had a value of 270 ohms; the resistor 24 has had a value of 22,000 ohms. The condenser 25 has had a value of 10 microfarads. Resistor 30 has had a value of 180,000 ohms. Condenser 31 has had a value of .05 microfarad. Resistor 32 and resistor 33 each has been 560 ohms. The signal appearing at the common terminal of condenser 31 and resistor 32 has been used to control the horizontal deflection generator and the signal appearing at the common terminal of resistor 32 and resistor 33 has been used to control the vertical deflection generator. These values are purely illustrative of one arrangement which has had good operating characteristics.

Figure 3:
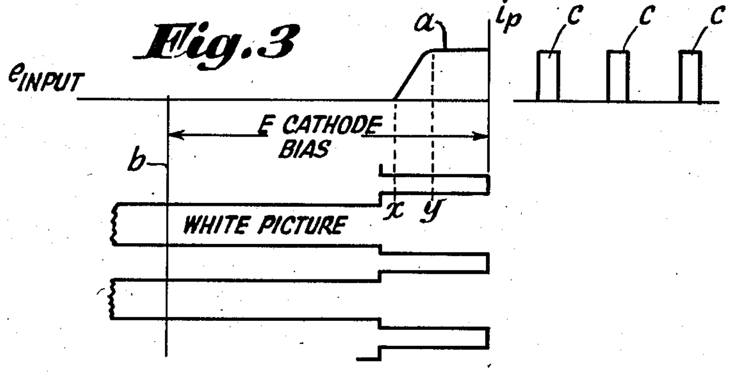
Figure 4:
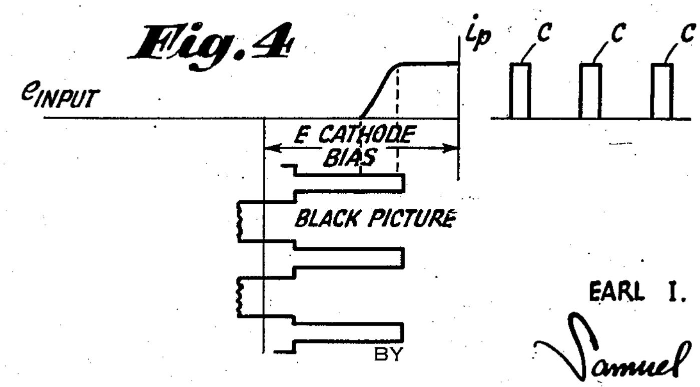

A reference to Figures 2, 3, and 4, which are explanatory curves, will better illustrate the operation of the device. Figure 2 shows the voltage input-plate current characteristic of a 6AU6 type of tube having some unbypassed cathode resistance added for the purpose of including a greater portion of the synchronizing signal between the clipping levels. It will be appreciated that whether or not this resistor is used will depend upon the type of tube used and the amplitude of the signal input thereto. In one practical embodiment its use has been advantageous. The solid line curve shows the characteristic of the same type of tube with an unbypassed cathode resistor and where a relatively large load resistor has been included in order to limit the maximum plate current. It will be noted that saturation is reached very quickly in the latter case. It may be seen that only that part of the signal between $x$ and $y$ of Figure 3 will appear in the output of tube 20 because clipping takes place at point $y$ due to plate saturation, and at point $x$ due to plate current cutoff. Hence, the upper and lower limits of the signal that passes through the tube are fixed and the tube effectively clips both in a positive and in a negative direction. The circuit parameters of the video stage preceding the tube 20 may be chosen so that, with a full contrast picture on the kinescope, the tops of the synchronizing signals will be approximately at cutoff of the video tube 10 and thus all noise and other spurious signals extending beyond this level will drive the video stage beyond cutoff and be clipped thereby.

Referring to Figure 3, there is shown the voltage input vs. plate current characteristic of the pentode that has been used and this curve has been identified as the curve $a$. The upper and lower limits of conduction in the tube have been indicated by dotted lines and the cathode bias has been indicated by the solid line $b$. Signals representing several lines of a picture have been illustrated for a white picture and it will be seen that a portion of the synchronizing signals falls within the range representing the upper and lower output current values of the tube. The output of the tube appearing in the plate circuit has been indicated by the pulses $c$.

With a so-called "black picture," the synchronizing signal still will fall within the conduction range of the tube 20 and a portion will be clipped and appear in the plate circuit of the tube as shown by the pulses $c$. These are the pulses which appear at the plate and are divided down across resistors 32 and 33 to control the deflection generators. This is shown in Figure 4.

The presence of the by-passed cathode resistor 24 across which is developed a D. C. voltage which is a function of the average value of the signal provides a source of voltage to effect the reinsertion of the direct current component in the reproduced image. This voltage is taken from the common terminal of resistors 23 and 24 and is impressed onto the control grid of the kinescope 27 by means of conductor 26 and thus effectively the direct current component is added to the signal impressed onto the kinescope 27. The value of this resistor also controls the lower clipping level of the tube and this is illustrated as the point $x$ in Figure 3.

In actual practice, resistors 11 and 12 have had a value of one megohm. Resistor 13 has had a value of 10,000 ohms and resistor 14 has had a value of 1,000 ohms. Inductance 40 has had a value of 320 microhenrys; resistor 41 has been 33,000 ohms; inductance 42 has been 520 microhenrys; resistor 43 has had a value of 6800 ohms; condenser 44 has been .25 microfarad; resistor 45 has been 150,000 ohms; resistor 46 has been 25,000 ohms; condenser 21 has been .1 microfarad and resistor 22 has been 1 megohm. Again, it will be appreciated that these values are given as purely exemplary of one arrangement which has been used in actual operation and which has given good results. The invention is not limited to the use of any or all of the illustrated circuit parameters.

Having now described my invention, what is claimed and desired to be secured by Letters Patent is the following:

1. In television apparatus, a video amplifier, load means connected to said video amplifier, means for impressing onto the input circuit of said video amplifier a composite signal comprising trains of video signals spaced apart by synchronizing signals having a range of voltage values outside of that of the video signals, said signals being impressed onto said input circuit in a fashion such that the excursions of voltage values in the synchronizing signal is in a negative direction, a cathode ray device having cathode and modulating electrodes, means to impress at least a portion of the signals from the output circuit of said video amplifier onto the cathode of said cathode ray device, a thermionic tube having anode, cathode, control and screen electrodes, circuit connections between said screen electrode and a source of potential to maintain said screen at a substantially fixed positive potential relative to said cathode, means for impressing at least a portion of the voltage variations occurring in said load means onto the control electrode-cathode path of said thermionic tube, load means connected in the anode-cathode path of said thermionic tube to limit the output current of said tube to a value that may be produced by the impression of a voltage onto the control electrode-cathode path of said tube within the range of voltage of said synchronizing signals, a resistor connected in the cathode-ground circuit of said tube, a capacitor connected across said resistor to establish a storage circuit of sufficient time constant to permit development across said capacitance of a voltage substantially representative of the average value of signal applied to said thermionic tube control electrode, said voltage influencing the plate cut-off point of said tube to remain within the range of voltages represented by the synchronizing signals, circuit connections from said cathode circuit to said cathode ray device modulating electrode to control the bias thereon in accordance with the voltage developed across said capacitance and coupling means connected with said thermionic tube anode-cathode load means whereby doubly clipped synchronizing pulses are available thereacross.

2. In a television apparatus variable conductance means having at least three electrodes for respective use as an anode, a cathode, and a control electrode, means for impressing a composite television signal including video and sync signals onto said control electrode for excitation thereof with the sync signal extending in a positive polarity direction, said signal impressing means being such to restrict the amplitude of the applied signal such that the voltage excursions of said control electrode in a positive direction do not exceed the potential of the cathode of said conductance device, a load impedance connected in the anode-cathode circuit of said conductance device the value of said impedance being sufficiently high to sharply define the maximum value of output current attainable under conditions of maximum excursions of said control electrode in a positive direction, a resistance connected in the cathode circuit of said conductance device and a capacitance connected across a portion of said resistance to establish a storage circuit having a sufficient time constant to permit development across said capacitance of a voltage substantially representative of the average value of the signal applied to said conductance device control electrode whereby doubly clipped sync signals are produced across the terminals of said anode-cathode load impedance.

3. In a television apparatus, a cathode ray kinescope connected to produce an image whose brightness is controllable by the potential of an electrode integral with said kinescope a vacuum tube having at least an anode, a cathode, a control grid, and a screen grid, means for impressing a composite television signal including video and sync signals and brightness information onto said control grid for excitation thereof with the sync signals extending in a positive polarity direction, means for applying television signal to said kinescope for characterizing the image thereon a load impedance connected in the anode-cathode circuit of said vacuum tube, the value of said impedance being sufficiently high to sharply define the limit of anode current attainable under conditions of maximum excursions of said control grid in a positive direction, a resistance connected in the cathode circuit of said vacuum tube, a capacitance connected across a portion of said resistance to establish a storage circuit having a sufficient time constant to permit development across said capacitance of a voltage substantially representative of the average value of the composite television signal input vacuum tube control grid and a connection from said storage circuit to said kinescope electrode for controlling the brightness of said image in accordance with the voltage developed across said capacitance.

4. Apparatus as defined in claim 3 wherein said resistance connected in the cathode circuit of said vacuum tube includes two portions, the first portion of which has connected thereacross said storage capacitance, the second portion of which is proportioned relative to said first portion to minimize voltage fluctuations apparent across said capacitance due to noise energy in the form of momentary positive excursions of applied composite signal in excess of sync peaks.

5. In a television system a video amplifier adapted for excitation by a composite signal comprising trains of video signals interspersed by regularly recurrent synchronizing signals having contour amplitudes in excess of said video signals, load means connected in the output circuit of said video amplifier, a cathode ray type image reproducing device having at least a control electrode and a cathode, electrical coupling between said video amplifier load circuit and said reproducing device cathode, a multi-grid vacuum tube having at least a cathode, anode, control grid and screen electrode, connections from a potential source to said screen electrode to maintain said screen electrode at a potential positively in excess of its related cathode, coupling means from said video amplifier load circuit to said multi-grid vacuum tube control grid to supply said grid with sync positive video signal of such amplitude as to preclude grid current flow, an anode resistance connected from said multi-grid vacuum tube anode to a source of polarizing potential, a cathode resistance connected from said multi-grid vacuum tube cathode to a point of fixed potential, a capacitance connected across a portion of said cathode resistance, the values of said cathode resistance and capacitance being so related to maintain plate current cut-off of said multi-grid vacuum tube for values of applied signal within the range defined by the limits of said synchronizing signal, a connection from said cathode resistance to said reproducing device control electrode to apply thereto a substantially non-pulsating D. C. potential representing the average value of the signal applied to said multi-grid vacuum tube control grid, and means for obtaining horizontal and vertical synchronizing pulses from the anode circuit of said multi-grid vacuum tube.

6. In a television apparatus, a thermionic tube having anode, cathode, at least one control electrode, and at least one screen electrode, circuit connections between said screen electrode and a potential source to maintain said screen electrode at a positive potential relative to said cathode, a source of composite video and synchronizing signals wherein said synchronizing signals are without the range of voltage of said video signals, means for impressing said composite signal onto the control electrode-cathode path of said thermionic tube in such a fashion that the excursions of the synchronizing signals are in a positive direction, said signal impressing means being such to restrict the amplitude of the composite signal so applied to a value below that causing conduction by said control electrode, resistive means connected in the anode-cathode path of said thermionic tube and having a value such that the saturation current of said thermionic tube is reached when a positive voltage within the range of the synchronizing signal voltages is impressed onto the control electrode-cathode path of said tube and resistive means with a capacitance shunted thereacross connected in the cathode-ground circuit of said thermionic tube the values of said resistive means and capacitance being so defined relative to electrical characteristics of said thermionic tube and the operating potentials applied thereto to cause the cutoff point of said tube to remain under substantially all useful applied signal amplitudes within the range of voltages represented by the synchronizing signal.

7. Apparatus in accordance with claim 6 wherein there is provided in addition a second resistive means connected in the cathode-ground circuit of said thermionic tube, said resistor being so proportioned relative to said cathode-ground circuit resistive means to minimize voltage variations across said means due to components of cathode current produced by spurious signal voltages of lesser duration than and exceeding the intensity of said synchronizing signals.

EARL I. ANDERSON.

REFERENCES CITED

The following references are of record in the file of this patent:

UNITED STATES PATENTS

| Number | Name | Date |
|---|---|---|
| 2,137,262 | Bowman-Manifold | Nov. 22, 1938 |
| 2,176,663 | Browne et al. | Oct. 17, 1939 |
| 2,177,723 | Kemp et al. | Oct. 31, 1939 |
| 2,255,484 | Dome | Sept. 9, 1941 |
| 2,276,565 | Crosby | Mar. 17, 1942 |
| 2,365,575 | Maxwell | Dec. 19, 1944 |
| 2,398,596 | Price | Apr. 16, 1946 |
| 2,419,548 | Greig | Apr. 29, 1947 |
| 2,433,378 | Levy | Dec. 30, 1947 |

FOREIGN PATENTS

| Number | Country | Date |
|---|---|---|
| 112,460 | Australia | Feb. 13, 1941 |
| 16,012 of 1934 | Australia | Jan. 31, 1935 |
| 408,656 | Great Britain | Aug. 9, 1934 |